(12) United States Patent
Tsutsumi

(10) Patent No.: US 7,830,568 B2
(45) Date of Patent: Nov. 9, 2010

(54) COLOR PROCESSING APPARATUS AND COLOR PROCESSING METHOD

(75) Inventor: Shohei Tsutsumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 661 days.

(21) Appl. No.: 11/693,158

(22) Filed: Mar. 29, 2007

(65) Prior Publication Data

US 2008/0239417 A1    Oct. 2, 2008

(51) Int. Cl.
    *H04N 1/46* (2006.01)
    *H04N 1/60* (2006.01)
    *G06K 9/00* (2006.01)

(52) U.S. Cl. .............. 358/518; 358/516; 358/519; 358/520; 358/521; 358/522; 358/523; 358/1.9; 382/162; 382/167

(58) Field of Classification Search .......... 358/518, 358/516, 519, 520, 1.9, 521, 522, 523; 382/162, 382/167
    See application file for complete search history.

(56) References Cited

U.S. PATENT DOCUMENTS 5,754,184 A * 5/1998 Ring et al. ............ 345/604
7,027,067 B1 * 4/2006 Ohga .................... 345/589
7,053,910 B2 * 5/2006 Newman ................ 345/604

OTHER PUBLICATIONS

M. Derhak, M. Rosen, "Spectral Colorimetry Using LabPQR—An Interim Connection Space", Color Imaging Conference 2004, U.S.A., Imaging Science and Technology, Nov. 2004, pp. 246-250.

S. Tsutsumi, M. Rosen, R. Berns, "Spectral Reproduction using LabPQR: Inverting the Fractional-Area-Coverage-to-Spectra Relationship", International Congress of Imaging Science, U.S.A., Imaging Science and Technology, May 2006, pp. 107-110.

\* cited by examiner

*Primary Examiner*—Charlotte M Baker
(74) *Attorney, Agent, or Firm*—Canon U.S.A. Inc., I.P. Division

(57) ABSTRACT

An output color is calculated from a fundamental stimulus value and a spectral support coefficient which indicate an input color using a calculation unit for calculating an output color corresponding to the input fundamental stimulus value and the input spectral support coefficient using a table whose inputs are a fundamental stimulus value and a spectral support coefficient. The interval of grid points of the table are uneven regarding the spectral support coefficient, and the interval in the vicinity whose relevant spectral support coefficient is zero is small as compared with the interval in the vicinity whose spectral support coefficient has a great absolute value.

22 Claims, 14 Drawing Sheets

SPECTRAL ERROR

COLOR PROCESSING APPARATUS AND COLOR PROCESSING METHOD

BACKGROUND OF THE INVENTION

1. Field of the Invention

The present invention relates to an apparatus or method for performing color processing using a table whose inputs are a fundamental stimulus value and a spectral support coefficient.

2. Description of the Related Art

Heretofore, the colors of colorants generating an output image of a color recording apparatus have been generally the three colors of cyan (C), magenta (M), and yellow (Y), which are the three primary colors serving as a subtractive color mixture, or the four colors, which black (K) is added thereto. In this case, the three color components of red (R), green (G), and blue (B) of input image data have been converted into the three colors of C, M, and Y, or the four colors including K, thereby generating an image using the colorant of each color. Also, in recent years, color reproduction apparatuses have been put on the market wherein in addition to the four fundamental colorants of C, M, Y, and K, the other colorants other than the three primary colors serving as a subtractive color mixture, i.e., the three colors of RGB serving as additional colors other than the fundamental colorants, such as red, green, blue, orange, and violet are added as colorants. Such a color reproduction apparatus can provide color reproduction that cannot be achieved with image reproduction using existing three colors or four colors.

Also, the demand for high image quality is increasing along with the rapid spread of color reproduction apparatuses in recent years, and it has been proposed to employ the spectral information of a visible wavelength region serving as input information to be given to color reproduction apparatuses. A color management system incorporating such spectral information (hereafter, referred to as spectral CMS) determines an output color such that the spectral error as to spectral information to be input becomes the minimum. Thus, in terms of the color appearance, an output image can be generated to match an input regardless of viewing conditions such as illuminant under viewing condition and so forth, i.e., metamerism can be reduced.

However, within the spectral CMS, the number of dimensions of data to be handled markedly increases, compared with the tristimulus values represented by the existing CIELAB, CIEXYZ, and so forth. For example, when sampling spectral information in a range of 400 nm through 700 nm in increments of 10 nm, spectral data to be obtained becomes 31 dimensions. In order to construct a simpler spectral CMS, it becomes important to reduce the number of dimensions without losing spectral information, and also to perform data compression effectively.

As for a data compression method of spectral information, a method for compressing spectral information employing spectral color space called as six-dimensional LabPQR has been proposed (see M. Derhak, M. Rosen, "Spectral Colorimetry Using LabPQR—An Interim Connection Space", Color Imaging Conference 2004, U.S.A., Imaging Science and Technology, November 2004, pp 246-250). This LabPQR includes L*a*b* values, so under a specific viewing condition on which the L*a*b* values depend, the same color reproduction as colorimetry color reproduction can be achieved. The LabPQR further includes PQR serving as spectral information, whereby metamerism can be reduced.

Also, with the above-described spectral CMS employing the LabPQR, a method for determining an output color rapidly using a color lookup table (CLUT) has been proposed (see S. Tsutsumi, M. Rosen, R. Berns, "Spectral Reproduction using LabPQR: Inverting the Fractional-Area-Coverage-to-Spectra Relationship", International Congress of Imaging Science, U.S.A., Imaging Science and Technology, May 2006, pp 107-110).

With a method for determining an output color of a reproduction apparatus via the spectral color space LabPQR of six dimensions based on spectral information to be input, in order to implement the spectral CMS using the CLUT, it is necessary to employ the six-dimensional CLUT. Accordingly, this causes a problem wherein the memory size for recording such a CLUT increases.

Further, with S. Tsutsumi, M. Rosen, R. Berns, "Spectral Reproduction using LabPQR: Inverting the Fractional-Area-Coverage-to-Spectra Relationship", International Congress of Imaging Science, U.S.A., Imaging Science and Technology, May 2006, pp 107-110, there is description wherein the spectral CMS employing the CLUT made up of the six-dimensional LabPQR is performed, but a method for generating the CLUT is not described at all.

SUMMARY OF THE INVENTION

To this end, with color processing for reducing metamerism, the present invention provides an apparatus or a method for reducing the memory size of a color conversion table while maintaining color reproduction accuracies.

A first aspect of the present invention provides a color processing apparatus, comprising: an input unit configured to input a fundamental stimulus value and a spectral support coefficient; and a calculation unit configured to calculate an output color corresponding to the input fundamental stimulus value and the input spectral support coefficient using a table whose inputs are a fundamental stimulus value and a spectral support coefficient; wherein the spectral support coefficient corresponds to a spectral error at the time of reconstructing spectral information from the fundamental stimulus value; and wherein the interval of grid points of said table are uneven regarding the spectral support coefficient, and the interval in the vicinity whose relevant spectral support coefficient is zero is small as compared with the interval in the vicinity whose spectral support coefficient has a great absolute value.

A second aspect of the present invention provides a color processing apparatus, comprising: an input unit configured to input a fundamental stimulus value and a spectral support coefficient; and a calculation unit configured to calculate an output color corresponding to the input fundamental stimulus value and the input spectral support coefficient using a table whose inputs are a fundamental stimulus value and a spectral support coefficient; wherein the spectral support coefficient corresponds to a spectral error at the time of reconstructing spectral information from the fundamental stimulus value; and wherein first and second coefficients whose degree of incidence given to spectral information differs are included in the spectral support coefficient, and with the table, the number of grid points of the first coefficient is greater than the number of grid points of the second coefficient.

A third aspect of the present invention provides a color processing apparatus, comprising: an input unit configured to input a fundamental stimulus value and a spectral support coefficient; and a calculation unit configured to calculate an output color corresponding to the input fundamental stimulus value and the input spectral support coefficient using a table whose inputs are a fundamental stimulus value and a spectral support coefficient; wherein the spectral support coefficient corresponds to a spectral error at the time of reconstructing spectral information from the fundamental stimulus value; and wherein first and second coefficients whose degree of incidence given to spectral information differs are included in the spectral support coefficient, and with the table, the range of the first coefficient is wider than the range of the second coefficient.

A fourth aspect of the present invention provides a color processing apparatus, comprising: an input unit configured to input a fundamental stimulus value and a spectral support coefficient; and a calculation unit configured to calculate an output color corresponding to the input fundamental stimulus value and the input spectral support coefficient using a table whose inputs are a fundamental stimulus value and a spectral support coefficient; wherein the spectral support coefficient corresponds to a spectral error at the time of reconstructing spectral information from the fundamental stimulus value; and wherein with the table, the number of dimensions of a spectral support coefficient differs depending on a color region.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and together with the description, serve to explain the principles of the invention.

DESCRIPTION OF THE EMBODIMENTS

First Embodiment

Figure 1:
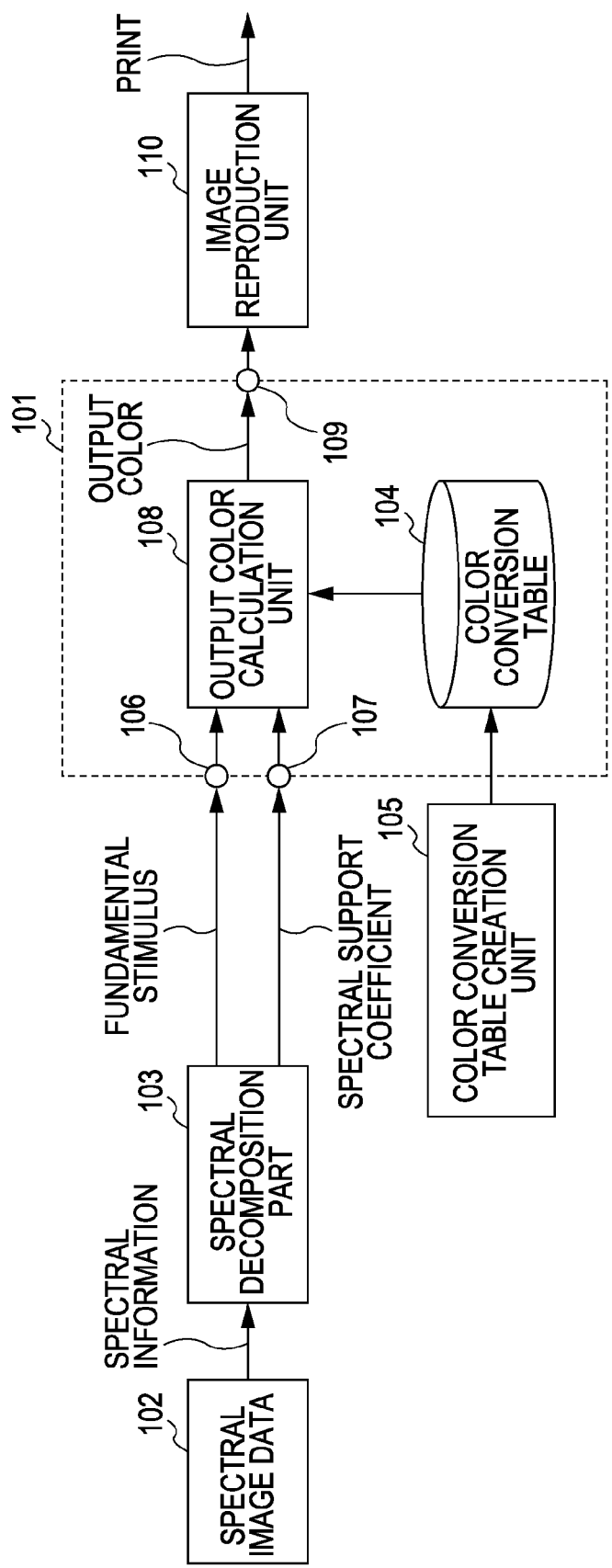
FIG. 1 is a block diagram illustrating the configuration of a color processing apparatus according to a first embodiment.

FIG. 1 is a block diagram illustrating the configuration according to a color processing apparatus serving as a first embodiment. Reference numeral 101 denotes a color processing unit for determining the value of an output color. Reference numeral 102 denotes input image data, which is the spectral information of each pixel. Reference numeral 103 denotes a spectral decomposition part for decomposing spectral information into a fundamental stimulus value and a spectral support coefficient. The fundamental stimulus value is one of tristimulus values in illuminant under a particular viewing condition represented with the CIELAB, CIEXYZ, and so forth, or a color value (e.g., RGB) derived and calculated therefrom. On the other hand, the spectral support coefficient corresponds to the spectral error at the time of reconstructing spectral information from the fundamental stimulus value. The spectral support coefficient is used for supplementing this spectral error.

Reference numeral 104 denotes a conversion table for correlating a pair of the fundamental stimulus value and the spectral support coefficient with an output color. Reference numeral 105 denotes a color conversion table creating unit for generating the color conversion table 104. Reference numeral 106 denotes the fundamental stimulus input terminal of the color processing unit 101, and 107 denotes the spectral support coefficient input terminal of the color processing unit 101. Reference numeral 108 denotes an output color calculation unit for calculating an output color from the fundamental stimulus value and the spectral support coefficient with reference to the color conversion table 104. Reference numeral 109 denotes the output terminal of the output color of the color processing unit 101, and 110 denotes an image reproduction unit by the color reproduction apparatus.

Spectral Information Composition Part

Figure 2:
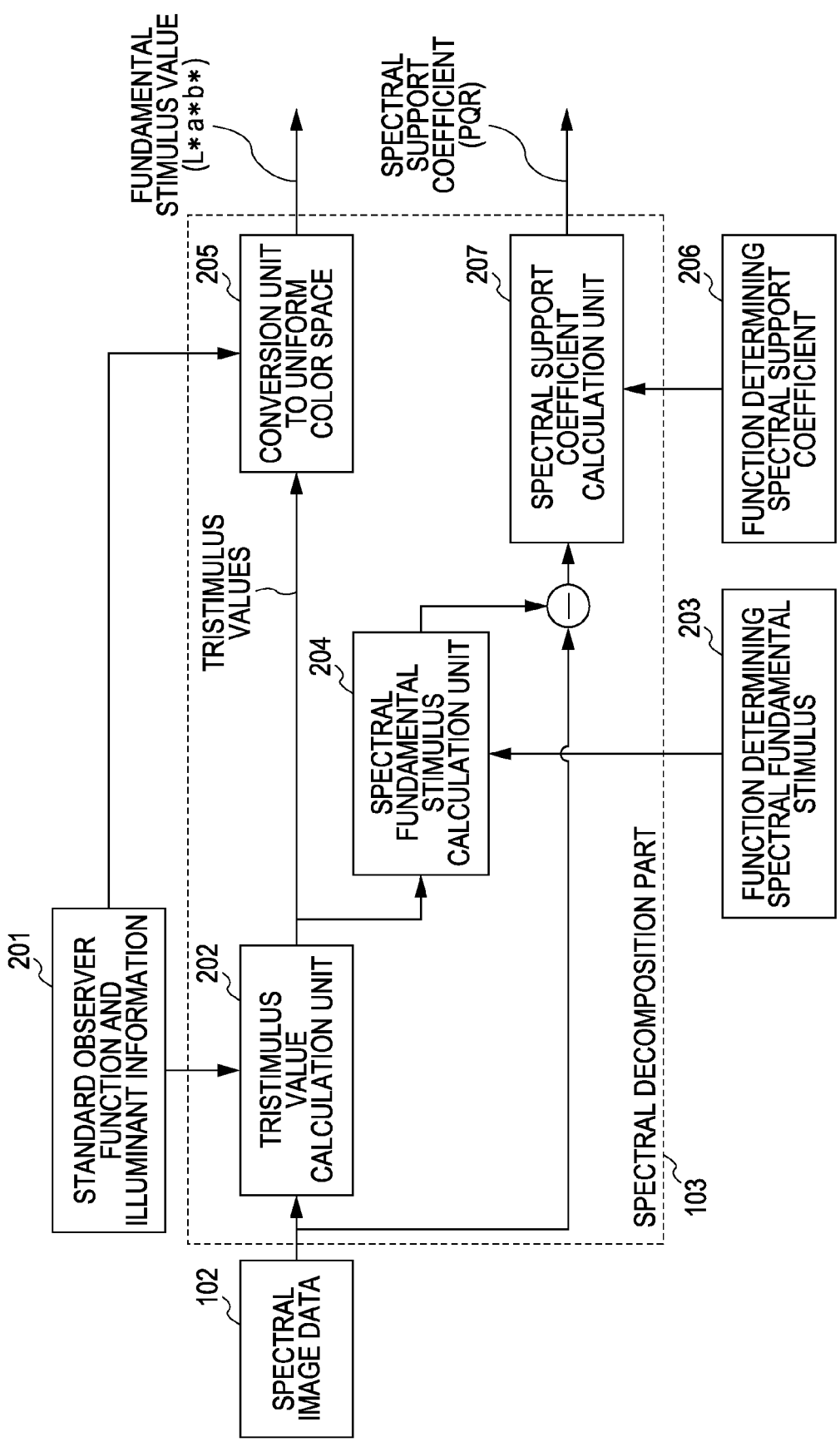
FIG. 2 is a block diagram illustrating the configuration of the spectral decomposition part in FIG. 1.

FIG. 2 is a block diagram illustrating the configuration of the spectral decomposition part 103. Reference numeral 201 denotes the information of a CIE standard observer function and illuminant under viewing condition. Reference numeral 202 denotes a tristimulus value calculation unit for calculating tristimulus values from spectral information using the CIE standard observer function and the information of illuminant under viewing condition. Reference numeral 203 denotes a function determining spectral fundamental stimulus to be used for calculating spectral fundamental stimulus from tristimulus values.

Figure 3:
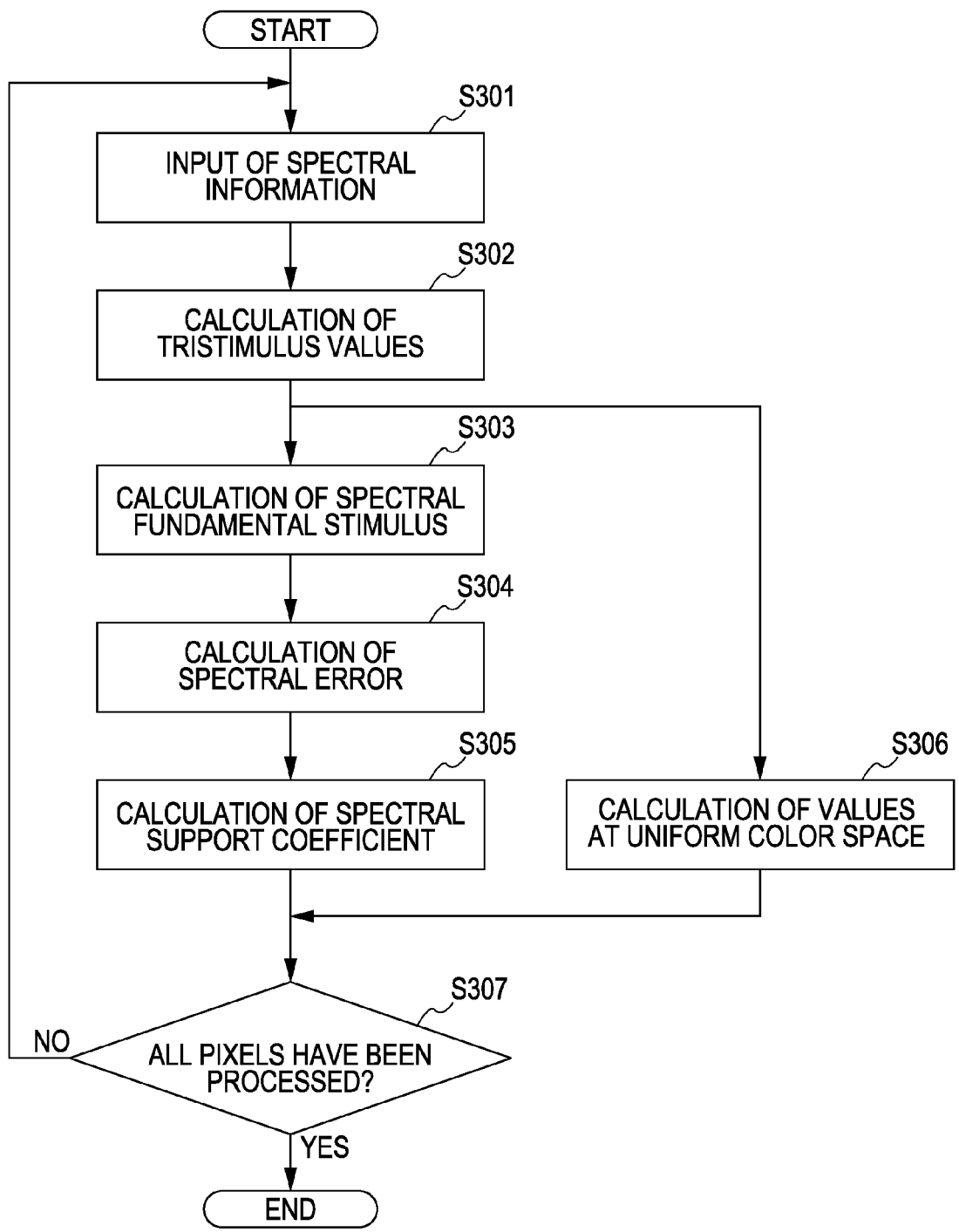
FIG. 3 is a flowchart illustrating the operation of the spectral decomposition part.

Reference numeral 204 denotes a spectral fundamental stimulus calculation unit for calculating a spectral fundamental stimulus from tristimulus values using the function determining spectral fundamental stimulus 203. Reference numeral 205 denotes a conversion unit for converting tristimulus values into fundamental stimulus values (L*a*b*) on the uniform color space. Reference numeral 206 denotes a function determining spectral fundamental stimulus used for calculating a spectral support coefficient from the spectral error between the spectral fundamental stimulus value and the spectral image data 102. Reference numeral 207 denotes a spectral support coefficient calculation unit for calculating a spectral support coefficient (PQR) from a spectral error using the function determining spectral support coefficient 206. Description will be made below regarding the operation of the spectral decomposition part in FIG. 2 in accordance with the flowchart in FIG. 3.

Figure 4:
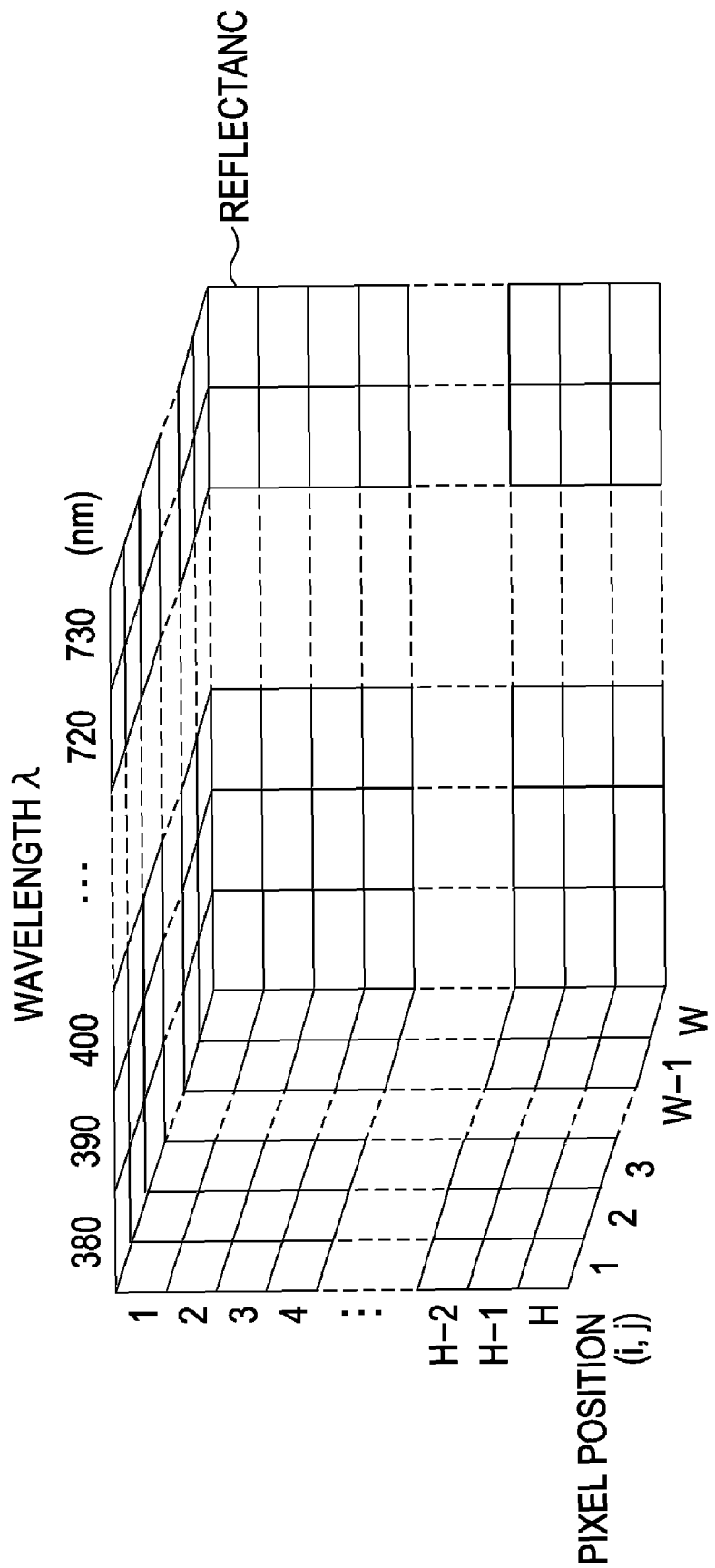
FIG. 4 is one example of a memory array storing a spectral image.

First, a spectral image is sequentially scanned with an unshown image scan unit to input spectral information R(i, j, λ) in each pixel (step S301). FIG. 4 is one example of a memory array storing the input spectral image data. The spectral image employed for the first embodiment is made up of the number of horizontal pixels W and the number of vertical pixels H. Subsequently, the spectral reflectance obtained by a wavelength λ cutting a visible region in a range of 380 nm through 730 nm in increments of 10 nm is stored at each pixel position. That is to say, each pixel includes 36-dimensional spectral reflectance data, and the reflectance at each dimension is a value varying between 0 and 1.

Next, the tristimulus value calculation unit 202 calculates tristimulus values CIEXYZ from the spectral reflectance at the pixel position (i, j) in accordance with the following equations (step S302), $$X(i, j) = k \sum_{\lambda=380}^{730} S(\lambda)R(i, j, \lambda)\bar{x}(\lambda)\Delta\lambda$$

$$Y(i, j) = k \sum_{\lambda=380}^{730} S(\lambda)R(i, j, \lambda)\bar{y}(\lambda)\Delta\lambda$$

$$Z(i, j) = k \sum_{\lambda=380}^{730} S(\lambda)R(i, j, \lambda)\bar{z}(\lambda)\Delta\lambda$$

$$k = \frac{100}{\sum_{\lambda=380}^{730} S(\lambda)\bar{y}(\lambda)\Delta\lambda}$$

wherein $S(\lambda)$ is the spectral radiance of illuminant under viewing condition. With the present embodiment, the CIE D50 illuminant is employed as illuminant information. $\bar{x}(\lambda)$, $\bar{y}(\lambda)$, and $\bar{z}(\lambda)$ are standard observer functions.

Next, the spectral fundamental stimulus calculation unit 204 calculates a spectral fundamental stimulus from the tristimulus values using the following equation (step S303), $$N(i,j,\lambda)=T \times Nc(i,j),$$

$$Nc(i,j)=[X(i,j),Y(i,j),Z(i,j)]^T$$

wherein N is a matrix representing a spectral fundamental stimulus having a size of 36×1, and T is a matrix representing the function determining spectral fundamental stimulus 203 having a size of 36×3. The function determining spectral fundamental stimulus 203 is prepared beforehand. Nc(i, j) is a matrix of 3×1 made up of the tristimulus values at the pixel position (i, j).

The superscript "T" described at the right side of the above expression denotes a transposed matrix. As can be understood from the above expression, the spectral fundamental stimulus calculation unit 204 calculates the identical spectral fundamental stimulus as to all of the combinations (metameric pairs) where the tristimulus values Nc are the identical value.

Next, the spectral difference between the spectral information R(i, j, λ) serving as input spectral image data and the spectral fundamental stimulus N(i, j, λ) is calculated with the following equation (step S304).

$$B(i,j,\lambda)=R(i,j,\lambda)-N(i,j,\lambda)$$

Subsequently, the spectral support coefficient calculation unit 207 calculates the spectral support coefficient Np(i, j) at the pixel position (i, j) in accordance with the following expression using the function determining spectral support coefficient 206 (step S305).

$$Np(i,j)=V^T \times B(i,j,\lambda)$$

Here, V is a matrix representing a function determining spectral support coefficient having a size of 36×3. With the first embodiment, the spectral support coefficient Np(i, j) is composed of three coefficients, and the respective coefficients are referred to as P, Q, and R.

Thus, while the spectral support coefficient Np is obtained from the tristimulus values Nc calculated in step S302, the conversion unit 205 calculates the fundamental stimulus value at the uniform color space from the tristimulus values Nc (step S306). With the first embodiment, the CIELAB is employed as uniform color space. The conversion from the tristimulus values Nc into the L*a*b* values is performed in accordance with the following equations.

$$L^*=116(f(Y/Yn)-16/116),$$

$$a^*=500(f(X/Xn)-f(Y/Yn)),$$

$$b^*=200(f(Y/Yn)-f(Z/Zn))$$

Here, function f(x) is defined as follows.

$$f(x)=x^{(1/3)} \ (x>0.008856)$$

$$f(x)=7.787x+16/116 \ (x \leq 0/008856)$$

Also, Xn, Yn, and Zn are the tristimulus values of reference white color under the illuminant of interest. With the present embodiment, the tristimulus values of the reference white under the CIE D50 illuminant are employed.

Finally, determination is made regarding whether or not the calculations of the spectral support coefficient Np and the L*a*b* values have been completed regarding all of the pixels (step S307). Subsequently, in the event that there is an unprocessed pixel, the flow returns to step S301, and repeatedly performs the processing from step S301 through S306.

With the first embodiment, let us say that the six-dimensional color space having both the L*a*b* values and the PQR values is referred to as LabPQR.

Figure 5:
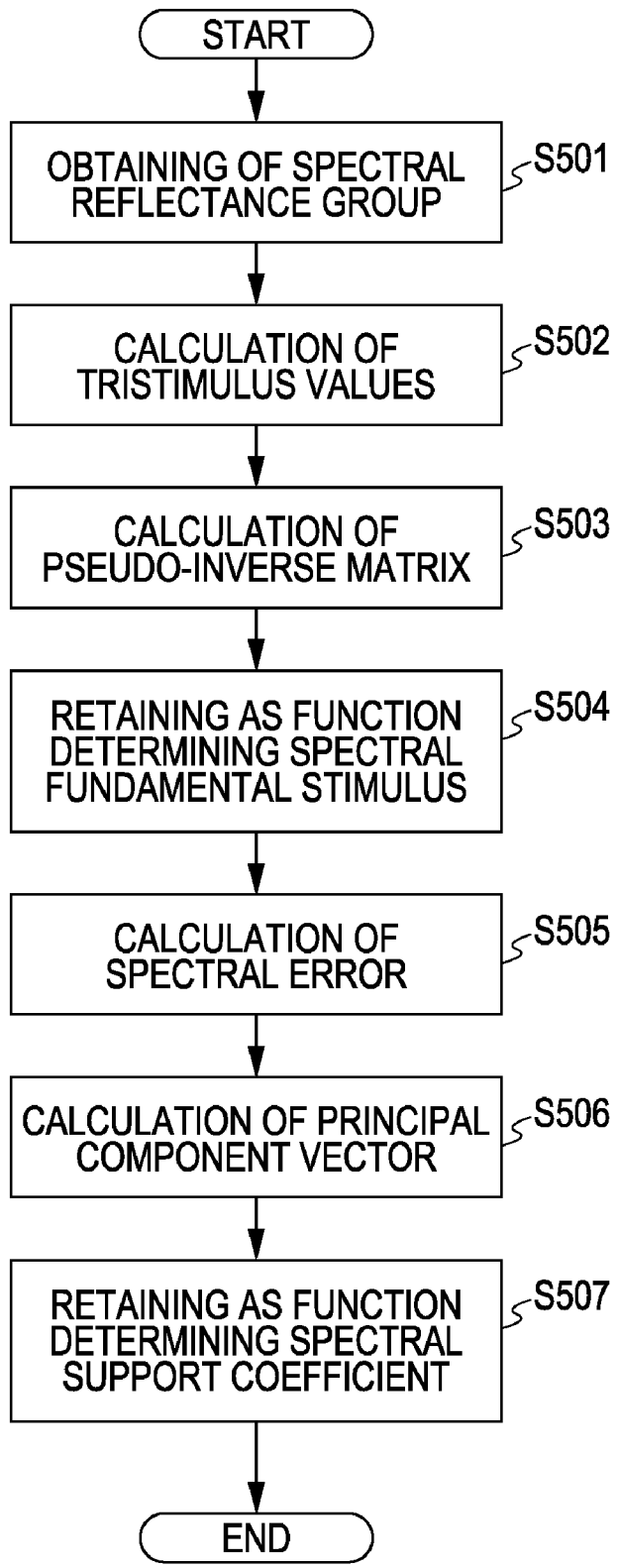
FIG. 5 is a flowchart illustrating a method for determining the function determining spectral fundamental stimulus and the function determining spectral support coefficient in FIG. 2.

Function Determining Spectral Fundamental Stimulus, Function Determining Spectral Support Coefficient Description will be made below in detail regarding a method for determining the function determining spectral fundamental stimulus 203 and the function determining spectral support coefficient 206 in accordance with the flowchart in FIG. 5.

First, in order to determine the above two functions, there is prepared a data set including the spectral reflectance of a plurality of sample colors (step S501).

With the first embodiment, as for sample colors, print patches having different colors of 729 colors randomly distributed in the CIELAB space are employed, which are formed at the image forming unit 110. Note that a patch means a color chart making up a uniform color distribution. Subsequently, as for spectral reflection data, the spectral reflection data obtained by measuring these patches is employed.

Also, as for a sample color, as long as a data group distributed within color space, there is no constraint as described above. For example, GretagMacbeth ColorChecker, ColorCheckerDC, Munsell Book of Color, or the like can be employed.

Next, the tristimulus values Nc are calculated from the input spectral reflectance of each print patch (step S502). A method for calculating the Nc from spectral reflectance is as described above.

Next, a pseudo-inverse matrix for reconstructing the spectral reflectance of input from the tristimulus values is calculated (step S503), and retains this as a function determining spectral fundamental stimulus T (step S504).

$$T = R \times \text{pinv}(Nc)$$

Figure 6:
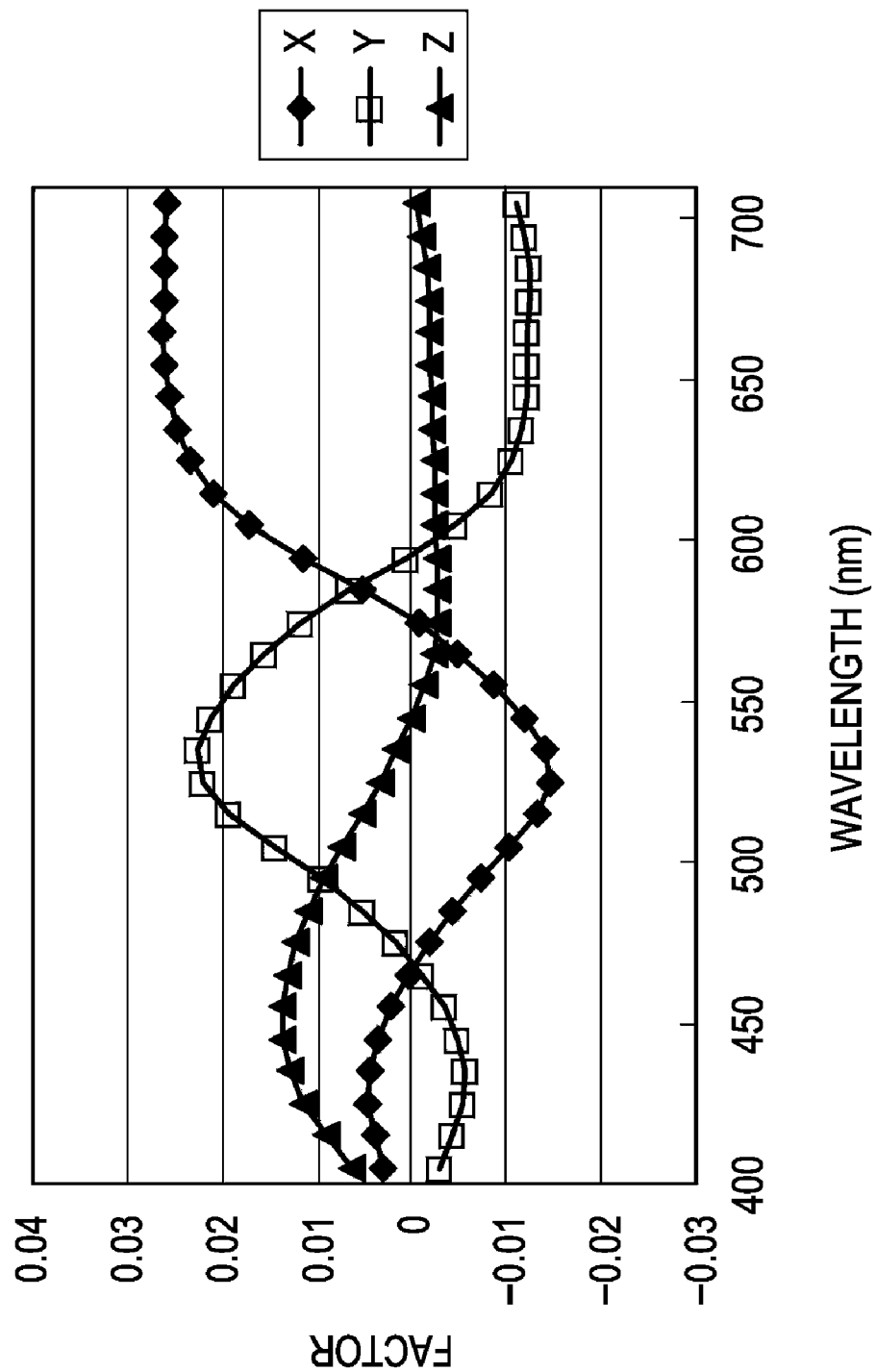
FIG. 6 is a function determining spectral fundamental stimulus derived from print patches of 729 colors.

The R according to the present embodiment is a matrix composed of a spectral reflectance group having a size of 36×729, which stores spectral reflectance in the row direction. Similarly, the Nc according to the present embodiment is a matrix composed of the tristimulus value group having a size of 3×729. The pinv( ) is a function for obtaining the pseudo-inverse matrix of an input matrix. FIG. 6 is a graph wherein the coefficient corresponding to each wavelength of the matrix T derived from the print patches of 729 colors is plotted.

The function determining spectral fundamental stimulus T and the tristimulus values Nc are employed, whereby the spectral reflectance of input can be estimated by using the following equation.

$$N = T \times Nc$$

Note that N is equivalent to the spectral fundamental stimulus. However, as describe above, spectral reflectance is determined uniquely as to a set of the tristimulus values Nc, and accordingly, spectral estimation capable of classifying a metameric pair cannot be accomplished by using the above equation.

In order to classify a metameric pair, it becomes necessary to newly provide a support index that takes spectral information into consideration in addition to the tristimulus values. Therefore, the spectral difference between the input spectral information R and the spectral fundamental stimulus T is calculated with the following equation (step S505).

$$B = R - N$$

Note that the matrix B stores all of the spectral errors of the print patches of 729 colors, and has a matrix size of 36×729.

Figure 7:
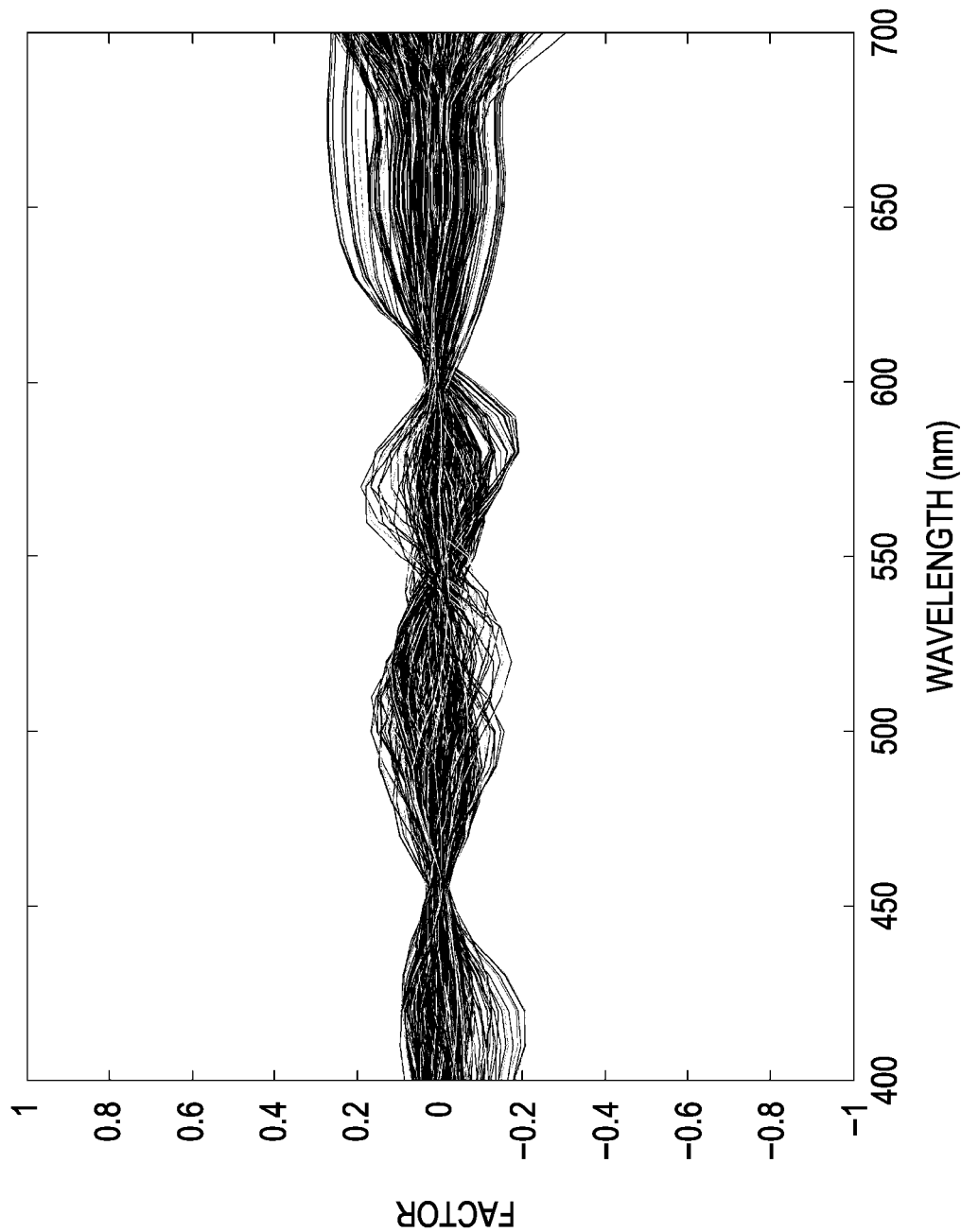
FIG. 7 is a plot the spectral error of a print patch.

FIG. 7 is a diagram plotting the spectral error of a sample color. The function determining spectral fundamental stimulus T is determined so as to minimize the spectral errors of the whole print patches, so errors are distributed centered on around zero.

Figure 8:
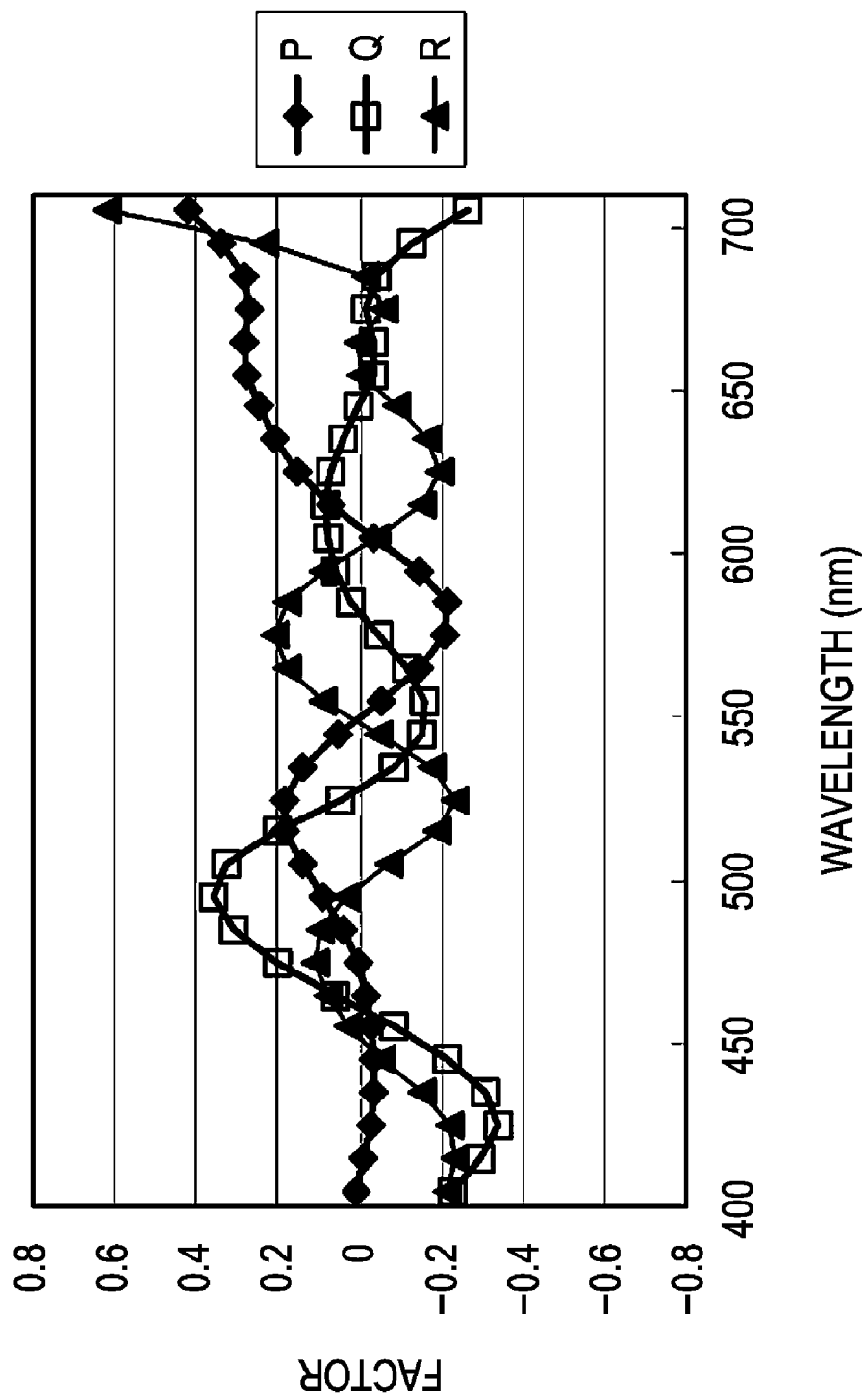
FIG. 8 is a function determining spectral support coefficient derived from the print patch.

Next, the significant eigenvector vi of the spectral error matrix B is calculated (step S506), and the first through third significant eigenvectors are preserved as a function determining spectral support coefficient V as follows (step S507).

$$V = (v1, v2, v3)$$

v1 is the first significant eigenvector, v2 is the second significant eigenvector, and v3 is the third significant eigenvector. Each of the significant eigenvectors has a size of 36×1. FIG. 8 is a diagram plotting the coefficient corresponding to each wavelength of the matrix V derived from a sample color. Description will be made regarding the calculation of an significant eigenvector. First, the covariance matrix of the spectral error matrix B is calculated in accordance with the following equation.

$$W = B \times B^T$$

Subsequently, the following equation is solved to obtain the specific value λi and specific vector vi (i is the number of dimensions of a vector) of the covariance matrix. Subsequently, the specific vector is a function determining spectral support coefficient.

$$W \times vi = \lambda i \times vi$$

According to the following processing, the function determining spectral fundamental stimulus T and the function determining spectral support coefficient V are determined.

Employing the function determining spectral fundamental stimulus T thus calculated enables a spectral support coefficient according to a spectral error to be calculated. According to this spectral support coefficient, the spectral difference can be also obtained regarding a metameric pair handled as the same stimulus value with conventional calorimetric reproduction. The processing for deriving the tristimulus values Nc and the spectral support coefficient Np from the spectral reflectance is performed by the spectral decomposition part 103. Spectral reflectance is reconstructed from the corresponding tristimulus values Nc and the spectral support coefficient Np. The spectral reconstruction is performed using the following equations.

$$R' = N + B$$
$$= T \times Nc + V \times Np$$

R' is the reconstructed spectral reflectance. The second term at the right side of the above equation represents the spectral difference of a metameric pair.

Distribution of Spectral Support Coefficient

Figure 9:
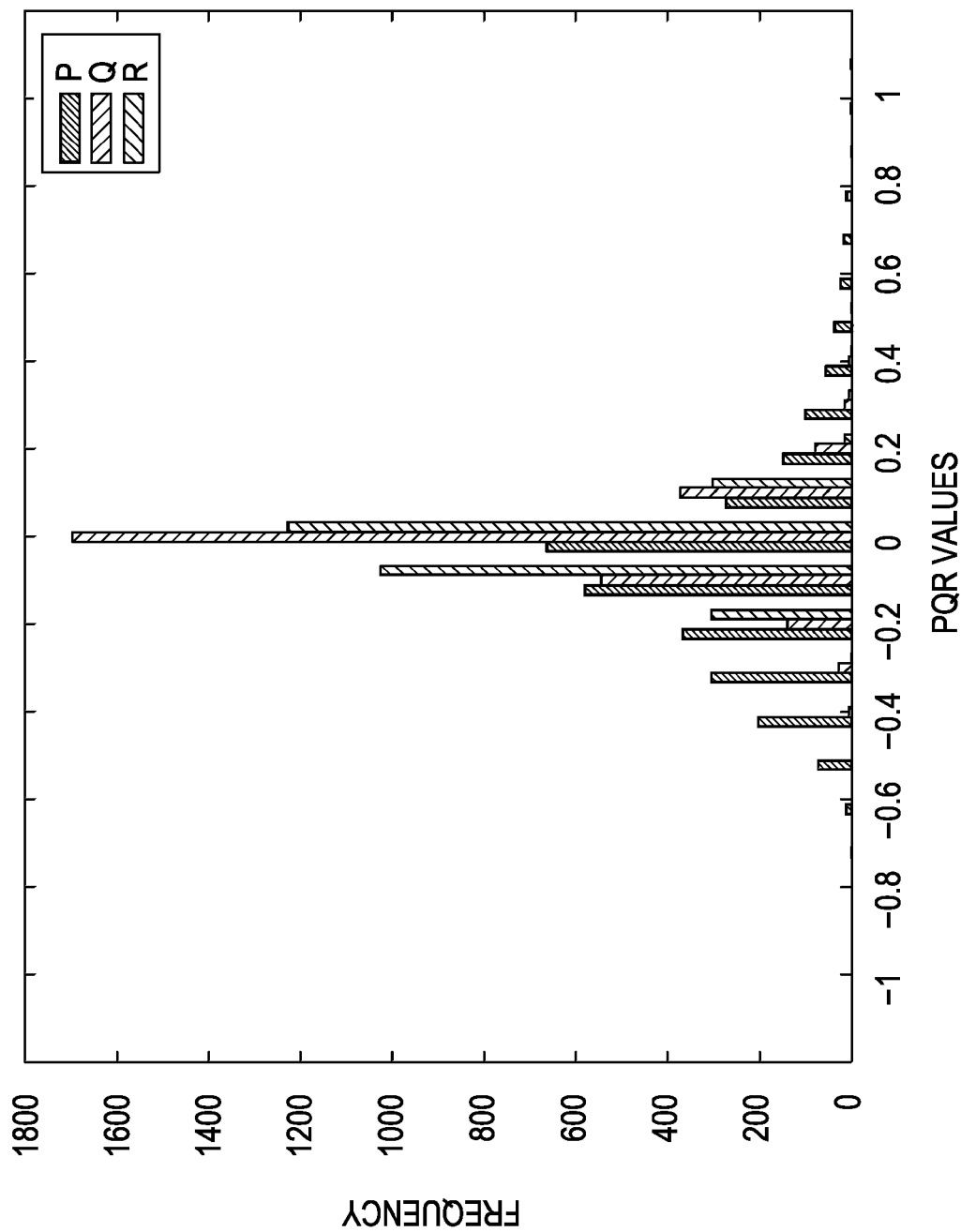
FIG. 9 is a histogram of PQR values derived with the function determining spectral fundamental stimulus and the function determining spectral support coefficient, which are calculated from the print patch.

FIG. 9 is a histogram of the spectral support coefficient Np of the sample color calculated with the function determining spectral fundamental stimulus T and the function determining spectral support coefficient V, i.e., the PQR values. Note that P, Q, and R are weighting coefficients as to the first, second, and third significant eigenvectors respectively. In addition to the print patches of 729 colors, GretagMacbeth ColorChecker (24 colors), ColorCheckerDC (240 colors), and Munsell Book of Color glossy edition (1600 colors), paint chips (120 colors), the spectral reflectance of objects including the colors in natures, such as human skin, plants, sky, and so forth (170 colors) are added to the histogram shown in FIG. 9. It can be said that this histogram includes the spectral reflectance of typical objects.

Two features regarding the PQR values can be observed from this histogram.

(1) Many samples are distributed in the vicinity where the PQR values become zero.

(2) The variation range of the PQR values is P>Q>R.

First, the first feature greatly relates to the distribution of spectral errors shown in FIG. 7. As described above, the spectral errors are approximated with the spectral support coefficient Np (PQR values) and the function determining spectral support coefficient V. Therefore, in the event that many samples are distributed in the vicinity where the spectral error is zero, the degree of dependence as to the function determining spectral support coefficient V becomes low, and the frequency of samples whose Np becomes a value nearby zero becomes high. Next, the reason why the second feature can be obtained is that the first significant eigenvector v1 corresponding to the P value is set to the direction indicating the largest variance in the distribution range of the spectral errors. The Q value and R value correspond to the second significant eigenvector v2, and the third significant eigenvector v3 respectively, so the variance range of the PQR values become P>Q>R. The color conversion table 104 is constructed focusing on the two features relating to the PQR values.

Conversion Table Creating Unit

Figure 10:
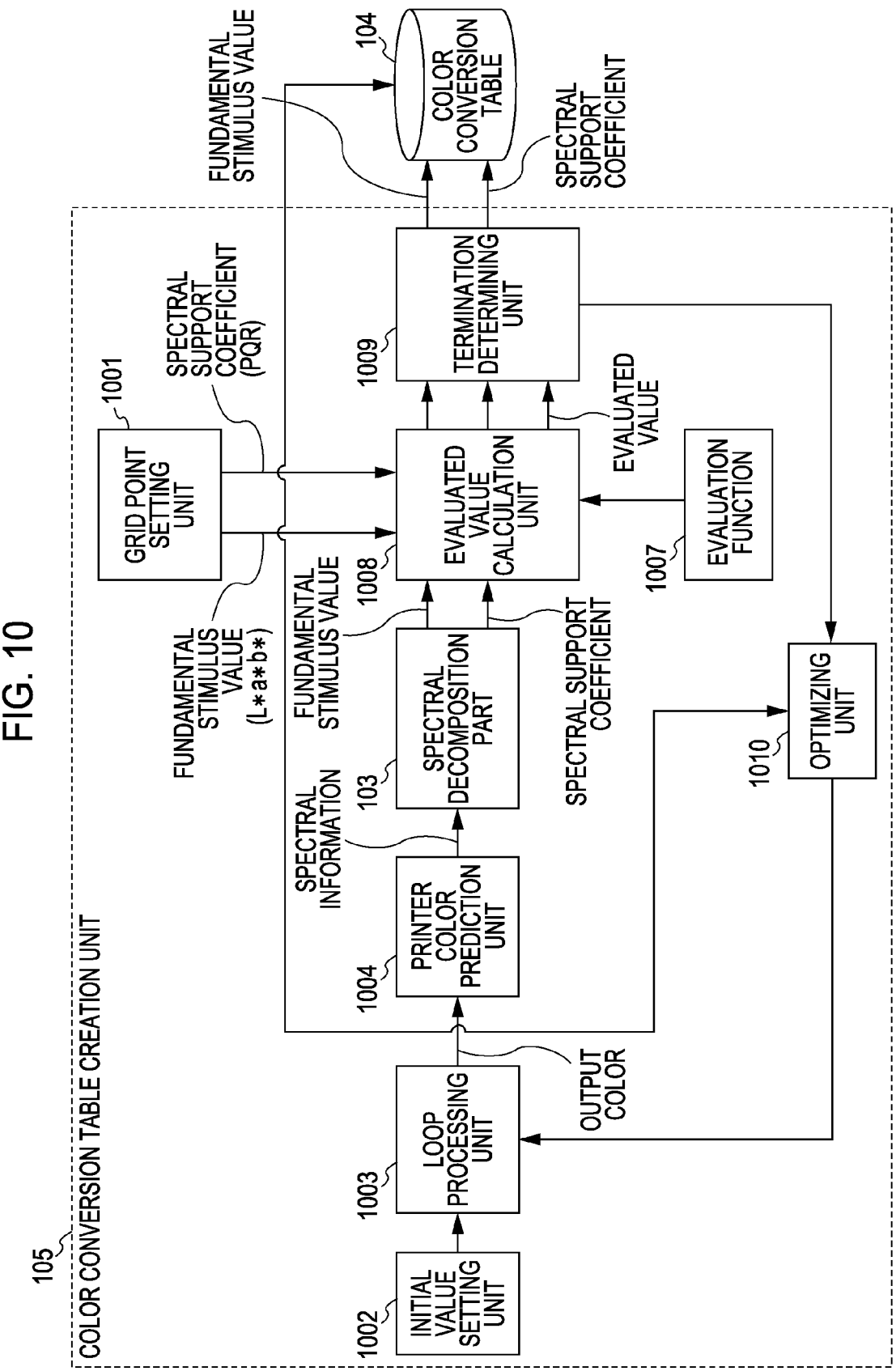
FIG. 10 is a block diagram illustrating the configuration of the color conversion table creating unit in FIG. 2.

FIG. 10 is a block diagram illustrating the configuration of the color conversion table creating unit 105. Reference numeral 1001 denotes a grid point setting unit for setting the grid points of the color conversion table 104. Reference numeral 1002 denotes an initial value setting unit for determining the initial values of parameters necessary when creating the color conversion table 104. Reference numeral 1003 denotes a loop processing unit for sequentially updating the parameters.

Reference numeral 1004 denotes a printer color prediction unit for predicting a color formed by the image reproduction unit 110. Reference numeral 1005 denotes the input terminal of the fundamental stimulus value, and 1006 denotes the input terminal of the spectral support coefficient. Reference numeral 1007 denotes an evaluation function for comparing between the fundamental stimulus value and spectral support coefficient input from the input terminals 1005 and 1006 and the fundamental stimulus value and spectral support coefficient provided from the spectral decomposition part 103.

Reference numeral 1008 denotes an evaluation value calculation unit for calculating an evaluation value using the evaluation function 1007. Reference numeral 1009 denotes a termination determining unit for determining regarding whether to end the loop processing. Reference numeral 1010 denotes an optimizing unit for searching the next output color to be given to the printer color prediction unit 1004.

Figure 11:
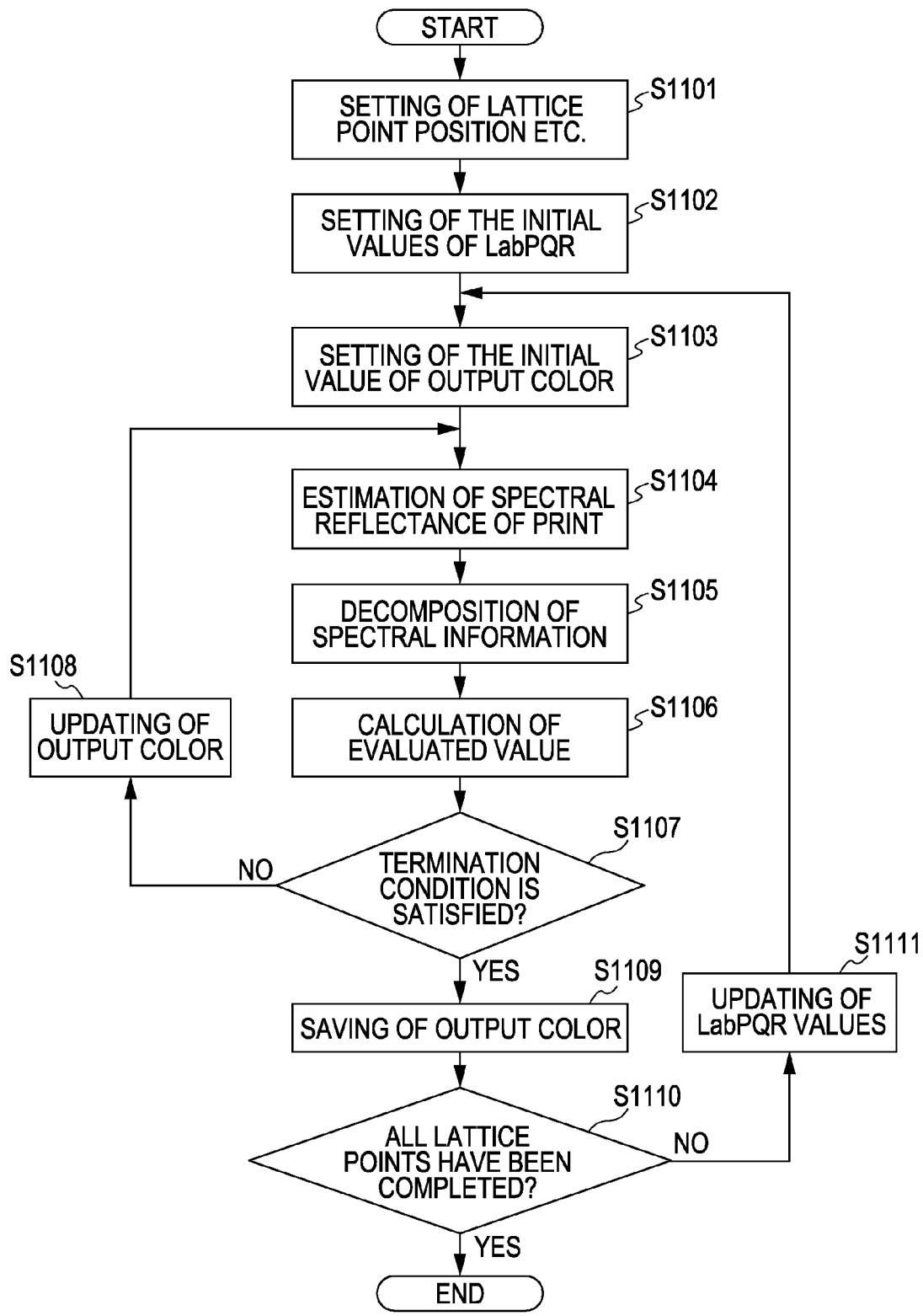
FIG. 11 is a flowchart illustrating the operation of the color conversion table creating unit.

Description will be made below regarding the operation of the color conversion table creating unit in FIG. 10 in accordance with the flowchart in FIG. 11.

First, the grid points setting unit 1001 sets the position of a grid point to be built in the color conversion table, and the like (step S1101). With the first embodiment, let us say that the $L^*a^*b^*$ values serving as the fundamental stimulus values, and the PQR values serving as spectral support coefficients are employed. Let us say that the color conversion table to be formed is made up of the spectral space of the LabPQR, and the number of dimensions thereof is six dimensions. Let us say that the number of grids in the $L^*a^*b^*$ space is 17×17×17, and sampling is performed evenly as to each of the axes such as shown in the following.

$L^* = 0, 6.25, 12.5, \ldots, 93.75, 100,$ $a^* = -128, -112, -96, \ldots, 112, 128,$ $b^* = -128, -112, -96, \ldots, 112, 128$ On the other hand, the setting of the grid points in the PQR space is performed by unevenly sampling with reference to the histogram of the PQR values in FIG. 9 as follows.

$P = -1.2, -0.8, -0.4, -0.2, 0, 0.2, 0.4, 0.8, 1.2,$ $Q = -0.8, -0.4, -0.2, 0, 0.2, 0.4, 0.8,$ $R = -0.6, -0.2, 0, 0.2, 0.6$

Accordingly, the grid points in the PQR space are 9×7×5, and the features at the time of setting the grid points in the PQR according to the first embodiment are:

(1) The interval in the vicinity of zero is small as compared with the interval in the vicinity having a great absolute value.

(2) With the definition region, P is set to be relatively wide, Q is set to be relatively narrow, and the relation thereof is $P \geq Q \geq R$.

(3) With the grid points, a relatively great number of Ps is set, but relatively few Qs are set, and the relation thereof is $P \geq Q \geq R$.

Figure 12:
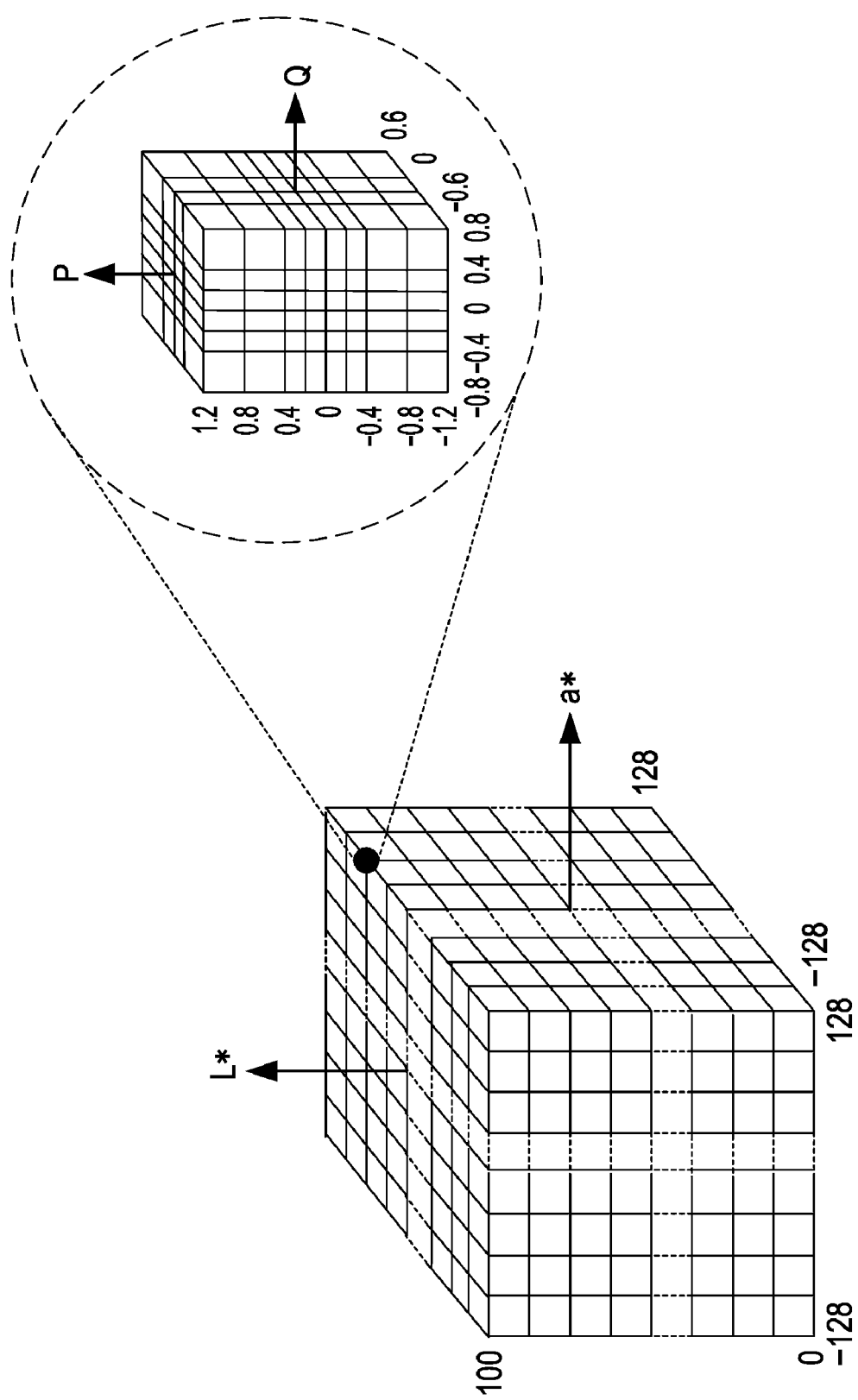
FIG. 12 is one example of a six-dimensional color conversion table.

FIG. 12 illustrates one example of the color conversion table employed for the first embodiment. This table is actually a six-dimensional color conversion table, but for the sake of convenience of explanation, this table is drawn by being divided into two three-dimensional color conversion tables. Each grid point in the CIELAB space retains the specific color conversion table corresponding to the PQR space. The number of grid points as the entire color conversion table is 17×17×17×9×7×5=1547595. Next, a grid point LabPQR_in (n) (wherein n is the grid point of interest) to be calculated first at the initial value setting unit 1002 is specified (step S1102). For example, LabPQR_in(1)=(0, −128, −128, −1.2, −0.8, −0.6) is set as the initial value thereof. Next, the initial value setting unit 1002 provides an appropriate output color as an initial value in order to perform appropriate processing (step S1103). Here, the result of an unshown random number generating apparatus generating a random number is provided as an initial value. Next, the printer color prediction unit 1004 predicts the spectral reflectance of the output color (step S1104). A spectral Neugebauer model is employed for the spectral prediction of a printer.

Next, the spectral decomposition part 103 decomposes the spectral reflectance of the output color into a fundamental stimulus value and a spectral support coefficient (step S1105). The decomposition method is as described above. Next, the evaluated value calculation unit 1008 compares between the LabPQR_in(n) values of the grid point of interest supplied from the grid point setting unit 1001, and the fundamental stimulus value ($L^*a^*b^*$ values) and spectral support coefficient (PQR values) supplied from the spectral decomposition part 103, and evaluates the degree of coincidence between the two sets of the LabPQR values (step S1106). The evaluation function 1007 shown in the following expression is employed for that evaluation.

$$\text{Eval} = \Delta Eab + \alpha \Delta PQR$$

Here, $\Delta Eab$ is the color difference in the CIELAB space, $\Delta PQR$ is the Euclidean distance in the PQR space, and a is a weighting coefficient. With the first embodiment, let us say that the weighting coefficient is a constant value such as $\alpha = 9$. Next, determination is made regarding whether or not the evaluated value Eval satisfies a termination condition (whether the evaluated value is a constant value or less, or the evaluated value Eval is converged following repeating the loop processing) (step S1107). In the event that the termination condition is not satisfied, an appropriate output color is updated at the optimizing unit 1010 (step S1108), and the processing from step S1104 through step S1106 is repeatedly performed. Here, the quasi-Newton method is employed as the searching method of the optimizing unit 1010. In the event that the evaluated value satisfies the termination condition, an output color is stored in the color conversion table as the optimal value with the LabPQR_in(n) (step S1109).

Next, determination is made whether or not the optimal output value has been determined at all of the grid points (step S1110), and in the event that the output value has not been determined at all of the grid points, they are updated to unprocessed LabPQR values (step S1111). Subsequently, the processing from step S1103 through step S1109 is repeatedly performed. Thus, the color conversion table 104 is created.

Note that $\Delta Eab$ has been employed as the color difference of the evaluation function 1007, but another color difference equation may be employed instead of $\Delta Eab$. There is no problem even if $\Delta E94$, $\Delta E00$, or something similar to color difference is employed.

The memory size (bytes) of the color conversion table can be calculated with the following expression.

$$\text{SIZE} = N\_grids \times Bo \times bo$$

Here, N_grids denotes the number of grid points within the color conversion table, Bo denotes the number of colors of the output color, and bo denotes the number of bytes necessary for representing the output color. As one example, description will be made regarding the case of employing an image forming apparatus having six output colors (Bo=6). At this time, let us say that bo=1, and each output color is represented with an integer value of 0 through 255. Let us say that the setting of the number of grids is the same as the previous example, i.e., 17×17×17×9×7×5. The color conversion table defined with such an arrangement has 1547595 grid points, so that the memory size is 9285570 bytes (around 1.5 megabytes).

For example, in the event of setting the grid points with an even interval of 0.2 at the defined region of the PQR equivalent to the first embodiment, the number of grid points of the color conversion table corresponding to the PQR space is 13×9×7. In the event that the setting of the grid points in the CIELAB space has no change such as 17×17×17, the memory size necessary for the color conversion table is around 3.8 megabytes, which requires around 2.5 times as much the memory size as compared with the uneven setting of the grid points.

When comparing with the memory size of the color conversion table necessary for existing three-dimensional colorimetry color reproduction, with the first embodiment employing the six-dimensional color conversion table, the memory size is apt to increase inevitably. Accordingly, increase of 2.5 times as much the memory size causes a problem also from the cost side. On the other hand, it can be conceived that evenly setting the grid points by widening the interval of the grid points in the PQR space to 0.3 or so prevents the memory size from increase.

However, as it is apparent from the histogram shown in FIG. 9, the interval of the grid points around zero point where many samples are distributed is also set to be wider, resulting in a shortcoming wherein the accuracy of the output color to be obtained with reference to the color conversion table decreases. With the first embodiment, as to a problem such as increase of the memory size which is hard to avoid in the many dimensional color conversion table, the distribution properties are taken into consideration, whereby the color conversion table which does not decrease the reproduction accuracies of an output with the minimum memory size can be created.

Output Color Calculation Unit

The output color calculation unit 108 determines an output color as to the L*a*b* values supplied from the fundamental stimulus value input terminal 106, and the L*a*b* values and PQR value supplied from the spectral support coefficient input terminal 107. More specifically, the output color calculation unit 108 determines an output color with many dimensional interpolation processing using the output color stored in the grid point of the color conversion table near the point of interest. Examples of the many dimensional interpolation processing include cubic interpolation, and tetrahedron interpolation.

Note that with the first embodiment, description has been made regarding the color conversion table having the size of 17×17×17×9×7×5, but it is needless to say that the interval of the grid points, the defined region of the grid points, and the number of grid points can be modified. Also, the grid point setting unit 1001 includes a user interface, and there is no problem even if an arrangement may be employed wherein the interval of the grid points, the defined region of the grid points, and the number of grid points can be set arbitrarily depending on user preference.

Further, with the first embodiment, the color conversion table has been described as one example wherein the interval in the vicinity whose spectral support coefficient is zero is small as compared with the interval in the vicinity whose spectral support coefficient has a great absolute value, but it is needless to say that even in the event of employing a color conversion table wherein the relative interval of the spectral support coefficient is not changed, and an offset is added to that spectral support coefficient, the present invention can provide an apparatus or a method for suppressing the memory size of a color conversion table while maintaining color reproduction accuracies.

Also, with the first embodiment, description has been made with the six-dimensional LabPQR as one example of the color space, but the number of dimensions of the spectral space which accompanies the CIELAB is not restricted to three dimensions. There is no problem even in the event of the four-dimensional color space composed of the P value and CIELAB corresponding to the first significant eigenvector, or the five-dimensional color space composed of the PQ values and CIELAB corresponding to the first significant eigenvector and the second significant eigenvector. Further, it is needless to say that the present first embodiment can be executed even in the event of employing the color space of seven dimensions or more in which the fourth significant eigenvector and on are taken into consideration.

As described above, according to the first embodiment, an output color is determined using a color conversion table whose keynote is the many dimensional spectral space LabPQR, whereby an output image that can reduce metamerism at high speed can be obtained. Further, when creating such a color conversion table, the distribution properties in the spectral space PQR of the reflectance of a typical object are taken into consideration, whereby the color conversion table can be provided wherein increase of the memory size necessary for the color conversion table is prevented, and also the accuracy of an output color at the time of interpolation processing is not deteriorated.

Second Embodiment

With the first embodiment, an arrangement has been made wherein each of the grid points of the color conversion table corresponding to the CIELAB space further includes the color conversion table of the spectral space (PQR) having the same number of dimensions. With the first embodiment, an arrangement is made wherein a high dimensional color conversion table is created in the color space region particularly necessary for reduction of metamerism, and a low dimensional color conversion table is created regarding the regions other than that region.

Figure 13:
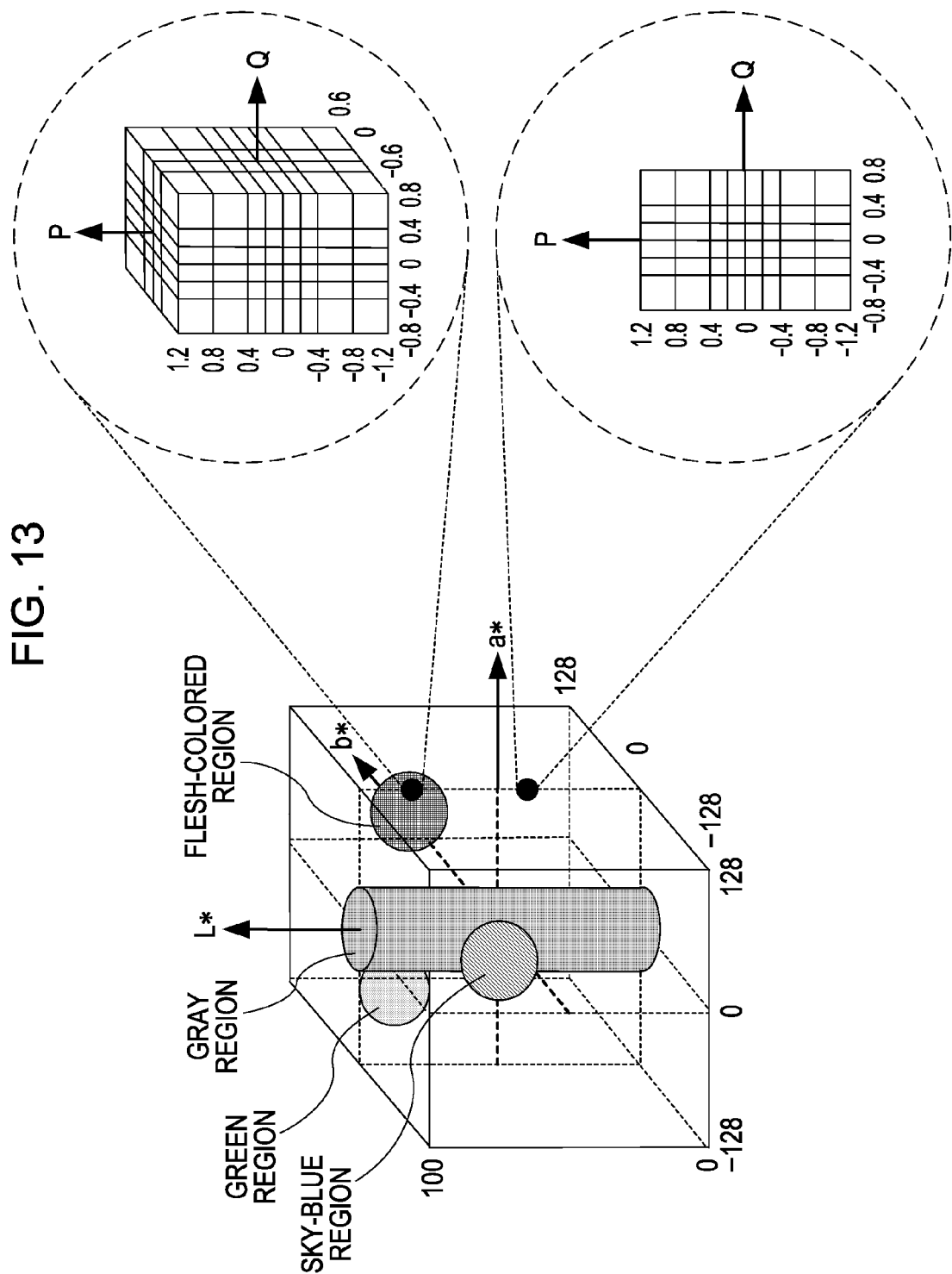
FIG. 13 is one example of a color conversion table whose number of dimensions differs depending on a color region.

FIG. 13 is one example of a color conversion table employed for the second embodiment. With the second embodiment, let us say that the regions particularly necessary for reduction of metamerism are a gray region, a flesh-colored region, a sky-blue region, and a green region. Let us say that these regions are referred to as important color regions. With the second embodiment, the color conversion table included in the important color regions within the CIELAB space is made up of six-dimensional LabPQR space, and with regard to the color regions other than those, the color conversion table is made up of five-dimensional color space LabPQ which is made up of the PQ values and CIELAB corresponding to the first significant eigenvector and the second significant eigenvector.

Figure 14:
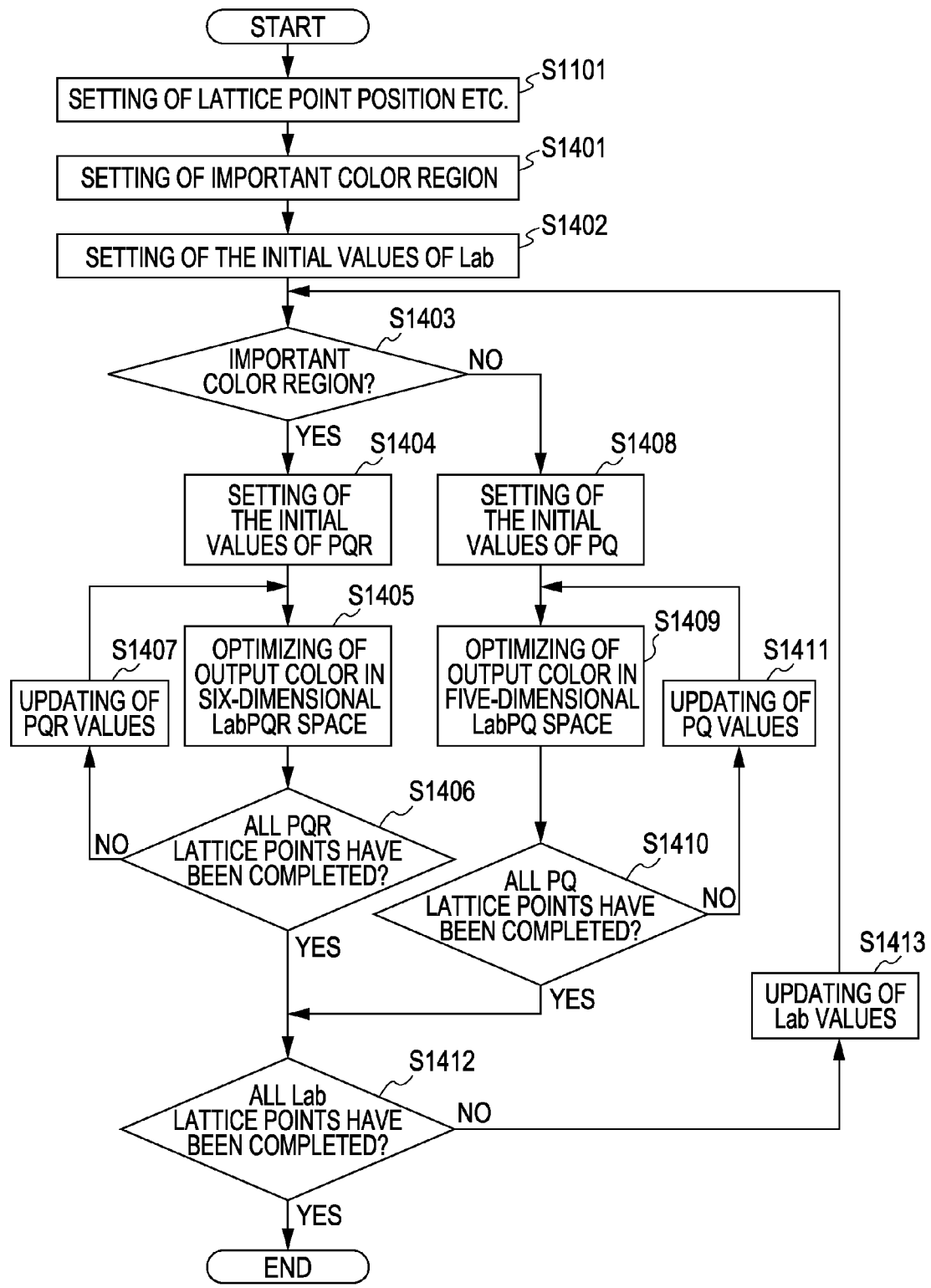
FIG. 14 is a flowchart illustrating the operation of a color conversion table creating unit serving as a second embodiment.

Description will be made below regarding the operation of the color conversion table creating unit 105 according to the second embodiment in accordance with the flowchart in FIG. 14.

First, the grid point setting unit 1001 sets the position of a grid point that is built in the color conversion table, and so forth (step S1101). Note that the setting of the position of a grid point is the identical as that in the first embodiment. Next, the important color regions wherein the color conversion table is constructed with the six-dimensional color space LabPQR are set as follows (step S1401).

gray region: $0 \leq L^* \leq 100, -16 \leq a^* \leq 16, -16 \leq b^* \leq 16$ flesh-colored region: $37.5 \leq L^* \leq 68.75, 0 \leq a^* \leq 32, 0 \leq b^* \leq 32$ sky-blue region: $25 \leq L^* \leq 56.25, -16 \leq a^* \leq 32, -64 \leq b^* \leq -16$ green region: $37.5 \leq L^* \leq 75, -48 \leq a^* \leq 0, 16 \leq b^* \leq 64$ Next, the initial value setting unit 1002 specifies a grid point Lab_in(m1) (wherein m1=1, 2, and so on through 4913) to be calculated first (step S1402). For example, the initial value setting unit 1002 sets Lab_in(1)=(0, −128, −128) to the initial value. Next, the initial value setting unit 1002 determines regarding whether or not the Lab_in(m1) corresponds to within the important color regions (step S1403). In the event that determination is made that the Lab_in(m1) is included in the important color regions, the initial value setting unit 1002 sets an initial value PQR_in(m2) (wherein m2=1, 2, and so on through 315) in the three-dimensional spectral space PQR (step S1404). For example, the initial value setting unit 1002 sets PQR_in(1)=(−1.2, −0.8, −0.6) as the initial value. In the event that determination is made in step S1403 that the input color Lab_in(m1) is outside the important color regions, the flow proceeds to step S1408. The processing of step S1408 and on will be described later.

Next, the optimal output color is derived with calculation as to the Lab_in(m1) and PQR_in(m2) in the six-dimensional LabPQR space (step S1405). The calculation method of the optimal output color is the same processing as the processing from step S1104 through step S1109 in the flowchart in FIG. 11, so description thereof will be omitted. Next, determination is made regarding whether or not the determination of an output color regarding all of the PQR grid points has been completed (step S1406), in the case of completion, the flow proceeds to step S1412. In the event that there is an unprocessed PQR grid point, the PQR values are updated (step S1407), and the processing from step S1405 to step S1406 is repeatedly performed.

On the other hand, in the event that determination is made in step S1403 that the Lab_in(m1) is outside the important color regions, the initial value setting unit 1002 creates a color conversion table using the five-dimensional LabPQ. First, the initial value setting unit 1002 sets an initial value PQ_in(m3) (wherein m3=1, 2, and so on through 63) in the two-dimensional spectral space PQ (step S1408). For example, the initial value setting unit 1002 sets PQ_in(1)=(−1.2, −0.8) as the initial value. Next, the optimal output color is derived with calculation as to the Lab_in(m1) and PQ_in(m3) in the five-dimensional LabPQ space (step S1409). The evaluation function 1007 differs between the optimization in the six-dimensional LabPQR space in step S1405 and the optimization processing of the five-dimensional LabPQ space. Specifically, an output color is determined with the evaluation function of the following expression.

Eval_$PQ = \Delta Eab + \alpha \Delta PQ$

Here, ΔEab is the color difference in the CIELAB space, ΔPQ is the Euclidean distance in the PQ space, and α is a weighting coefficient. With the second embodiment, let us say that the weighting coefficient is a constant value such as α=9. Next, determination is made regarding whether or not determination of an output color regarding all of the PQ grid points has been completed (step S1410), and in the event of completion, the flow proceeds to step S1412. In the event that there is an unprocessed PQ grid point, the PQ values are updated (step S1411), and the processing from step S1409 to step S1410 is repeatedly performed. Finally, determination is made regarding whether or not determination of an output color regarding all of the L*a*b* grid points has been completed (step S1412), and in the event that there is an unprocessed grid point, the L*a*b* values are updated (step S1413), and the processing from step S1403 to step S1412 is repeatedly performed. Thus, the color conversion table 104 is created.

Note that ΔEab has been employed as the color difference of the evaluation function 1007, but the color difference expression that can be employed for the evaluation function is not restricted to this. There is no problem even if ΔE94, ΔE00, or something similar to color difference is employed.

Also, with the second embodiment, gray, flesh-colored, sky-blue, and green are determined as the important color regions, but the range that can be applied to the important color region is not restricted to this. Also, even in the event of determining only a gray region as the important color region, or even in the event of determining a combination of several types of color regions as the important color region (e.g., gray and flesh-colored regions), the present second embodiment can be executed. Further, there is no problem even if a low-saturation color is stipulated as the important color region, and a high-saturation color is stipulated as the unimportant color region.

Also, with the second embodiment, the number of dimensions of color space mixed within the same color conversion table is set to six dimensions and five dimensions depending on a color region, but the combination of the number of dimensions of the color conversion table is not restricted to this. There is no problem even in the case of the combination of five dimensions and four dimensions, which are down by one rank as compared with the case of the second embodiment, or even in the case of the combination of six dimensions and four dimensions whose difference in the number of dimensions is two dimensions. Further, even in the case of the combination of six dimensions, five dimensions, and four dimensions whose number of dimensions is changed into three steps, or even in the case of taking the color space of seven dimensions or more into consideration wherein the fourth significant eigenvector and on are taken into consideration, it is certain that the present invention can provide an apparatus or a method for suppressing the memory size of a color conversion table while suppressing deterioration of color reproducibility.

Note that with the second embodiment, description has been made regarding the color conversion table having a size of 17×17×17×9×7×5 as one example, but it is needless to say that the interval of the grid points, the defined region of the grid points, and the number of grid points can be modified. Also, the grid point setting unit 1001 includes a user interface, and there is no problem even if an arrangement may be employed wherein the interval of the grid points, the defined region of the grid points, and the number of grid points can be set arbitrarily depending on user preference.

As described above, according to the second embodiment, the number of dimensions in spectral space is set low regarding the color regions other than the important color regions necessary for reduction of metamerism, whereby the memory size necessary for the color conversion table can be further suppressed without deteriorating color reproduction accuracies in the important color regions.

Third Embodiment

With the first and second embodiments, when determining the function determining spectral stimulus 203 for calculating a spectral fundamental stimulus from a fundamental stimulus value, the data group including spectral reflectance such as a print article or the like is employed, but the method for determining the function determining spectral stimulus is not restricted to the above-mentioned method. There is no problem even if an arrangement may be made wherein a specific data group is not employed, the function determining spectral stimulus is determined using a standard observer function, illuminant under viewing condition, and so forth.

Also, with the first and second embodiments, description has been made employing the CIELAB serving as the fundamental stimulus value, but there is no problem even in the event of employing another fundamental stimulus. For example, the fundamental stimulus value is one of tristimulus values in illuminant under a particular viewing condition represented with the CIELUV, CIEXYZ, and so forth, or a color value (e.g., RGB) derived and calculated therefrom. Further, even in the case of employing a color appearance model such as CIECAM97, CIECAM02, or the like in which apparent effects are taken into consideration as the fundamental stimulus value, the second and third embodiments can be executed.

Other Embodiments

It is needless to say that the present invention can provide an apparatus or a method for suppressing the memory size of a color conversion table while maintaining color reproduction accuracies by an arrangement wherein a recording medium in which the program code of software for realizing the functions of the above-mentioned embodiments is recorded is supplied to a system or an apparatus, and the computer (or CPU or MPU) of the system of apparatus thereof reads out and executes the program code stored in the recording medium. In this case, the program code itself read out from the recording medium realizes the functions of the above-mentioned embodiments, and the recording medium storing the program code thereof makes up the present invention.

As for a recording medium (computer-readable medium) for supplying the program code, for example, a flexible disk, a hard disk, an optical disc, a magneto-optical disk, CD-ROM, CD-R, magnetic tape, a nonvolatile memory card, ROM, DVD, or the like can be employed.

Also, it is needless to say that not only a case in which the computer executes the readout program code, thereby realizing the functions of the above-mentioned embodiments, but also a case in which the operating system (OS) or the like running on the computer performs a part or all of the actual processing based on the instructions of the program code thereof, and the functions of the above-mentioned embodiments are realized by the processing thereof, are also encompassed in the present invention.

Further, it is needless to say that a case in which the program code read out from the recording medium is written in the memory provided in a function expansion board inserted in the computer or in a function expansion unit connected to the computer, following which based on the instructions of the program code thereof, the CPU or the like provided in the function expansion board or function expansion unit performs a part of all of the actual processing, and the functions of the above-mentioned embodiments are realized by the processing thereof, is also encompassed in the present invention.

As many apparently widely different embodiments of the present invention can be made without departing from the spirit and scope thereof, it is to be understood that the invention is not limited to the specific embodiments thereof except as defined in the appended claims. The scope of the following claims is to be accorded the broadest interpretation so as to encompass all modifications, equivalent structures and functions.

What is claimed is:

1. A color processing apparatus, comprising:
a fundamental stimulus input unit to input a fundamental stimulus value and;
a spectral support coefficient input unit to input a spectral support coefficient; and
an output color determination unit to determine an output color corresponding to said input fundamental stimulus value and said input spectral support coefficient using a table whose inputs are a fundamental stimulus value and a spectral support coefficient,
wherein said spectral support coefficient corresponds to a spectral error of spectral information reconstructed from said input fundamental stimulus value, and
wherein the interval of grid points of said table are uneven regarding said spectral support coefficient.

2. The color processing apparatus according to claim 1, wherein said spectral support coefficient corresponds to the principal component of said spectral error.

3. The color processing apparatus according to claim 1, wherein said fundamental stimulus value is one of tristimulus values in illuminant under specific viewing condition, or a color value derived from said tristimulus values.

4. The color processing apparatus according to claim 1, wherein the interval of grid points in the vicinity where the spectral support coefficient is zero is smaller than the interval of grid points where the spectral support coefficient has a great absolute value.

5. A color processing apparatus, comprising:
a fundamental stimulus input unit to input a fundamental stimulus value;
a spectral support coefficient input unit to input a spectral support coefficient; and
an output color determination unit to determine an output color corresponding to said input fundamental stimulus value and said input spectral support coefficient using a table whose inputs are a fundamental stimulus value and a spectral support coefficient,
wherein said spectral support coefficient corresponds to a spectral error of spectral information reconstructed from said fundamental stimulus value, and
wherein first and second coefficients whose degree of incidence given to spectral information differs are included in said spectral support coefficient, and with said table, the number of grid points of said first coefficient is greater than the number of grid points of said second coefficient.

6. The color processing apparatus according to claim 5, wherein said fundamental stimulus value is one of tristimulus values in illuminant under specific viewing condition, or a color value derived from said tristimulus values.

7. The color processing apparatus according to claim 5, wherein said spectral support coefficient corresponds to the principal component of said spectral error.

8. A color processing apparatus, comprising:
a fundamental stimulus input unit to input a fundamental stimulus value;
a spectral support coefficient input unit to input a spectral support coefficient; and
an output color determination unit to determine an output color corresponding to said input fundamental stimulus value and said input spectral support coefficient using a table whose inputs are a fundamental stimulus value and a spectral support coefficient,
wherein said spectral support coefficient corresponds to a spectral error of spectral information reconstructed from said fundamental stimulus value, and
wherein first and second coefficients whose degree of incidence given to spectral information differs are included in said spectral support coefficient, and with said table, the range of said first coefficient is wider than the range of said second coefficient.

9. The color processing apparatus according to claim 8, wherein said fundamental stimulus value is one of tristimulus values in illuminant under specific viewing condition, or a color value derived from said tristimulus values.

10. The color processing apparatus according to claim 8, wherein said spectral support coefficient corresponds to the principal component of said spectral error.

11. A color processing apparatus, comprising:
a fundamental stimulus input unit to input a fundamental stimulus value;
a spectral support coefficient input unit to input a spectral support coefficient; and
an output color determination unit to determine an output color corresponding to said input fundamental stimulus value and said input spectral support coefficient using a table whose inputs are a fundamental stimulus value and a spectral support coefficient,
wherein said spectral support coefficient corresponds to a spectral error of spectral information reconstructed from said fundamental stimulus value, and
wherein with said table, the number of dimensions of the spectral support coefficient differs depending on a color region.

12. The color processing apparatus according to claim 11, wherein said spectral support coefficient corresponds to the principal component of said spectral error.

13. The color processing apparatus according to claim 11, wherein said fundamental stimulus value is one of tristimulus values in illuminant under specific viewing condition, or a color value derived from said tristimulus values.

14. The color processing apparatus according to claim 11, wherein with said table, the number of dimensions of a spectral support coefficient differs depending on the degree of incidence of metamerism.

15. A color processing method, comprising:
using a processor to perform:
inputting a fundamental stimulus value;
inputting a spectral support coefficient; and
determining an output color corresponding to said input fundamental stimulus value and said input spectral support coefficient using a table whose inputs are a fundamental stimulus value and a spectral support coefficient,
wherein said spectral support coefficient corresponds to a spectral error of spectral information reconstructed from said fundamental stimulus value, and
wherein first and second coefficients whose degree of incidence given to spectral information differs are included in said spectral support coefficient, and with said table, the range of said first coefficient is wider than the range of said second coefficient.

16. A computer-readable medium having stored thereon a program for causing a color processing apparatus to perform a color processing method according to claim 15.

17. A color processing method, comprising:
using a processor to perform:
inputting a fundamental stimulus value;
inputting a spectral support coefficient; and
calculating, using an output color calculating unit, an output color corresponding to said input fundamental stimulus value and said input spectral support coefficient using a table whose inputs are a fundamental stimulus value and a spectral support coefficient,
wherein said spectral support coefficient corresponds to a spectral error of spectral information reconstructed from said fundamental stimulus value, and
wherein with said table, the number of dimensions of a spectral support coefficient differs depending on a color region.

18. A computer-readable medium having stored thereon a program for causing a color processing apparatus to perform a color processing method according to claim 16.

19. A color processing method, comprising:
using a processor to perform:
inputting a fundamental stimulus value;
inputting a spectral support coefficient; and
determining, an output color corresponding to said input fundamental stimulus value and said input spectral support coefficient using a table whose inputs are a fundamental stimulus value and a spectral support coefficient,
wherein said spectral support coefficient corresponds to a spectral error of spectral information reconstructed from said fundamental stimulus value, and
wherein first and second coefficients whose degree of incidence given to spectral information differs are included in said spectral support coefficient, and with said table, the number of grid points of said first coefficient is greater than the number of grid points of said second coefficient.

20. A computer-readable medium having stored thereon a program for causing a color processing apparatus to perform a color processing method according to claim 18.

21. A color processing method, comprising:
using a processor to perform
inputting a fundamental stimulus value;
inputting a spectral support coefficient; and
determining, an output color corresponding to said input fundamental stimulus value and said input spectral support coefficient using a table whose inputs are a fundamental stimulus value and a spectral support coefficient,
wherein said spectral support coefficient corresponds to a spectral error of spectral information reconstructed from said fundamental stimulus value, and
wherein the interval of grid points of said table are uneven regarding said spectral support coefficient.

22. A computer-readable medium having stored thereon a program for causing a color processing apparatus to perform a color processing method according to claim 18.

* * * * *